United States Patent [19]

Führen

[11] Patent Number: 5,182,634
[45] Date of Patent: Jan. 26, 1993

[54] METHOD FOR ENCODING AND EXTENDED COMPOSITE TELEVISION SIGNAL WITH CROSSTALK COMPENSATION AND APPARATUS FOR DECODING

[75] Inventor: Marcel Führen, Eindhoven, Netherlands

[73] Assignee: U.S. Philips Corporation, New York, N.Y.

[21] Appl. No.: 547,745

[22] Filed: Jul. 3, 1990

[30] Foreign Application Priority Data

Jul. 7, 1989 [NL] Netherlands ............. 8901741

[51] Int. Cl.$^5$ .................. H04N 11/06; H04N 7/00; H04N 11/00
[52] U.S. Cl. ................................. 358/12; 358/36; 358/167; 358/164; 358/142
[58] Field of Search ................. 358/141, 12, 167, 36, 358/37, 32, 166, 164, 142

[56] References Cited

U.S. PATENT DOCUMENTS

| | | | |
|---|---|---|---|
| 3,737,561 | 6/1973 | Boer | 358/36 |
| 4,246,610 | 1/1981 | Takahashi | 358/167 |
| 4,811,097 | 3/1989 | Ritter et al. | 358/160 |
| 4,918,515 | 4/1990 | Faroudjn et al. | 358/11 |

FOREIGN PATENT DOCUMENTS 0114391 5/1988 Japan.
0241190 9/1990 Japan.

Primary Examiner—James J. Groody
Assistant Examiner—S. Metjahic
Attorney, Agent, or Firm—Michael E. Marion

[57] ABSTRACT

According to an aspect of the invention, the most perceivable interference patterns occuring during display of an extended television signal on a standard receiver are precompensated in an extended encoding apparatus, preferably in such a manner that an extended decoding apparatus may cancel this precompensation again. According to a further aspect of the invention, the low-frequency luminance interference patterns at the encoding end are calculated by approximation, whereafter, on the basis of this knowledge, a low-frequency portion of a luminance signal is modified in such a manner that the low-frequency brightness variations caused by this modification compensate to the best possible extent the low-frequency brightness variations caused by the crosstalk of the additional signal.

13 Claims, 2 Drawing Sheets

METHOD FOR ENCODING AND EXTENDED COMPOSITE TELEVISION SIGNAL WITH CROSSTALK COMPENSATION AND APPARATUS FOR DECODING

BACKGROUND OF THE INVENTION

The invention relates to a method of encoding, compatible with conventional television signals, an extended television signal comprising conventional television signal components and simultaneously at least one additional signal.

The invention further relates to an apparatus for decoding an extended television signal, encoded compatible with a conventional television signal, comprising conventional television signal components and simultaneously at least one additional signal, said apparatus comprising means for decoding of the at least one additional signal.

Several systems have already been proposed to improve existing composite television systems. In a number of these proposals, an additional signal is encoded in the high-frequency portion of the active video spectrum by means of an extended encoder circuit. The method with which this additional signal is encoded differs per system, but it always causes artifacts on display on a conventional or standard receiver as the receiver considers the additional signal as if it were a normal part of the video information, whereby crosstalk of the additional signal to both the luminance signals and the chrominance signals may occur in the standard receiver. This crosstalk results in brightness errors and/or color errors on a standard display screen.

SUMMARY OF THE INVENTION

It is inter alia an object of the invention to reduce these faults.

A encoding method of the type defined in the opening paragraph is characterized in that crosstalk of the at least one additional signal to at least one of said conventional television signal components is precompensated.

A first advantageous and simple embodiment of the encoding method is characterized in that a low-frequency luminance signal and a precompensating luminance error signal are combined into a precompensated low-frequency luminance signal.

A second advantageous and simple embodiment of the encoding method is characterized in that a precompensation signal is calculated from at least a crosstalk-free television signal component and a crosstalk signal obtained from the additional signal, and the precompensation signal is combined with at least one of said conventional television signal components.

A decoding apparatus of the type defined in the opening paragraph is characterized by means for obtaining and removing a precompensation signal from at least one of said conventional television signal components.

A first advantageous and simple embodiment of the decoding apparatus is characterized by means for combining a precompensated low-frequency luminance signal and a luminance error signal forming the precompensation signal to form a low-frequency luminance signal.

A second advantageous and simple embodiment of the decoding apparatus is characterized by means for calculating the precompensation signal from a decoded television signal component and a crosstalk signal obtained from the additional signal, and for combining the precompensation signal with at least one of said conventional television signal components.

The invention is based on the following recognition. The crosstalk of the additional signal to the luminance signal manifests itself in a brightness interference pattern with high horizontal frequencies on the display screen, and because of the non-linearity of the display screen (the "gamma"), as a brightness interference pattern with low-frequencies, which, however, is usually not perceivable. The crosstalk of the additional signal to the chrominance signals causes in first instance color interference patterns which inherently are limited to low horizontal frequencies. Because of the fact that the "constant luminance principle" is not satisfied, the chrominance signals also include brightness information. This has inter alia for its result that interference patterns in decoded chrominance signals will also cause brightness interference patterns on the display screen. Because of the inherent low-frequency character of chrominance signals, the patterns will therefore be low-frequency brightness interference patterns. These latter interference patterns are found to have the highest negative effect on the compatibility of the extended television signal, i.e. the degree to which the display of the extended television signal on the standard receiver is free of interferences.

According to one aspect of the invention, the most observable interference patterns which occur on display of the extended television signal on the standard receiver are precompensated in an extended encoding apparatus, preferably in such a manner that an extended decoding apparatus can cancel this precompensation again. According to a further aspect of the invention, said low-frequency brightness interference patterns at the encoding end are calculated by approximation, whereafter, with this knowledge, the low-frequency portion of the luminance signal is modified such that low-frequency brightness variations caused by this modification compensate to the best possible extent low-frequency brightness variations caused by the crosstalk of the additional signal.

The precompensation according to the invention provides the advantage that at the decoding end the precompensation signal may optionally be processed in a very simple manner without the need for additional measures, namely by obtaining the conventional television signal components by means of a standard decoding circuit, wherein the precompensation signal is automatically compensated by the crosstalk occurring in the standard decoding circuit.

BRIEF DESCRIPTION OF THE DRAWINGS

These and other (more detailed) aspects of the invention will now be described and elucidated with reference to the drawings and examples.

The invention will now be described by way of non-limitative example with reference to the accompanying drawings, wherein.

DETAILED DESCRIPTION OF PREFERRED EMBODIMENTS OF THE INVENTION

Figure 1A:
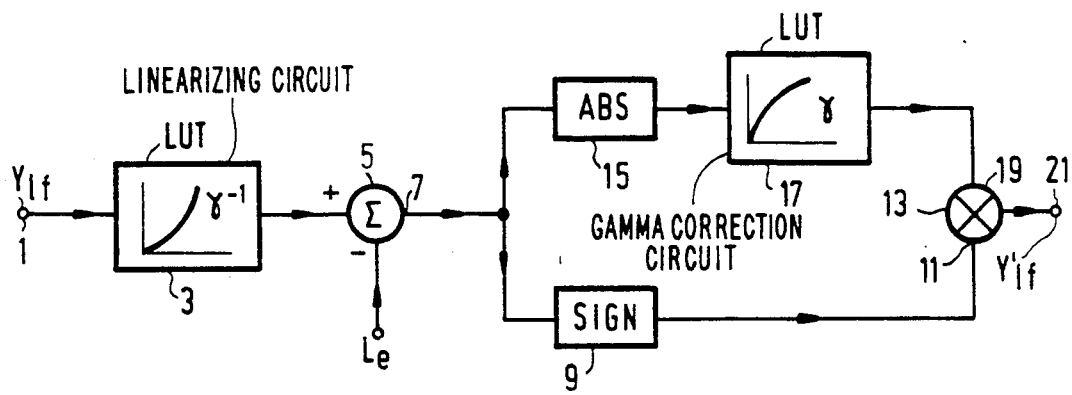
FIG. 1a shows how at the encoding end a precompensated low-frequency luminance signal can be generated in a precompensation circuit according to the invention from a low-frequency luminance signal and a luminance error signal.

In FIG. 1a a low-frequency luminance signal Ylf is applied to an input 1 of a precompensation circuit. The input 1 is connected to a non-inverting input of a subtracting circuit 5 via a linearizing or inverse gamma-correction circuit 3 including a Look Up Table. A precompensation signal formed by a luminance error signal Le is applied to an inverting input of the subtracting circuit 5. An output 7 of the subtracting circuit 5 is connected to a first input 11 of a multiplier 13 via a sign-determining circuit (SIGN) 9. The output 7 of the subtracting circuit 5 is also connected via an absolute value-determining circuit (ABS) 15 and a gamma-correction circuit 17 provided with a look up table to a second input 19 of the multiplier 13, an output 21 of which supplies a precompensated low-frequency luminance signal Ylf'.

The mode of operation of the components 9 to 17 may be represented by the following formulae:

$$Ylf' = (Ylf^g - Le)^{1/g} \text{ if } Ylf^g \geq Le \text{ and}$$

$$Ylf' = (Le - Ylf^g)^{1/g} \text{ if } Ylf^g < Le.$$

wherein g is an assumed mean value for the inverse of the "gamma". A value for g equal to 2 appears to lead to very good results in practice.

Because of the non-linear operations, higher frequency components may be found in Ylf' than in Ylf. Should this not be wanted, then Ylf' must be subjected to a low-pass filtering.

Figure 1B:
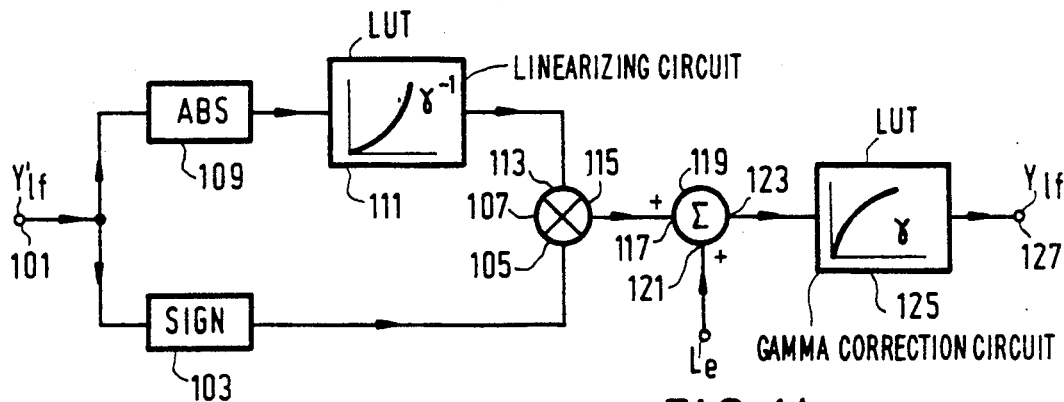
FIG. 1b shows how at the decoding end the low-frequency luminance signal can be generated in a compensation circuit according to the invention from the low-frequency precompensated luminance signal and a luminance error signal.

In FIG. 1b the precompensated low-frequency luminance signal Ylf' is applied to an input 101 of a compensation circuit. The input 101 is connected to a first input 105 of a multiplier 107 via a sign-determining circuit (SIGN) 103. The input 101 of the compensation circuit is also connected to a second input 113 of the multiplier 107 via an absolute value-determining circuit (ABS) 109 and a linearization or inverse gamma-correction circuit 111 provided with a look up table. An output 115 of the multiplier 107 is connected to a first input 117 of an adder 119, the luminance error signal Le being applied to a second input 121 thereof. An output 123 of the adder 119 is connected via a gamma-correction circuit 125 provided with a look up table to an input 127 of the compensation circuit, which supplies the low-frequency luminance signal Ylf.

Figure 2:
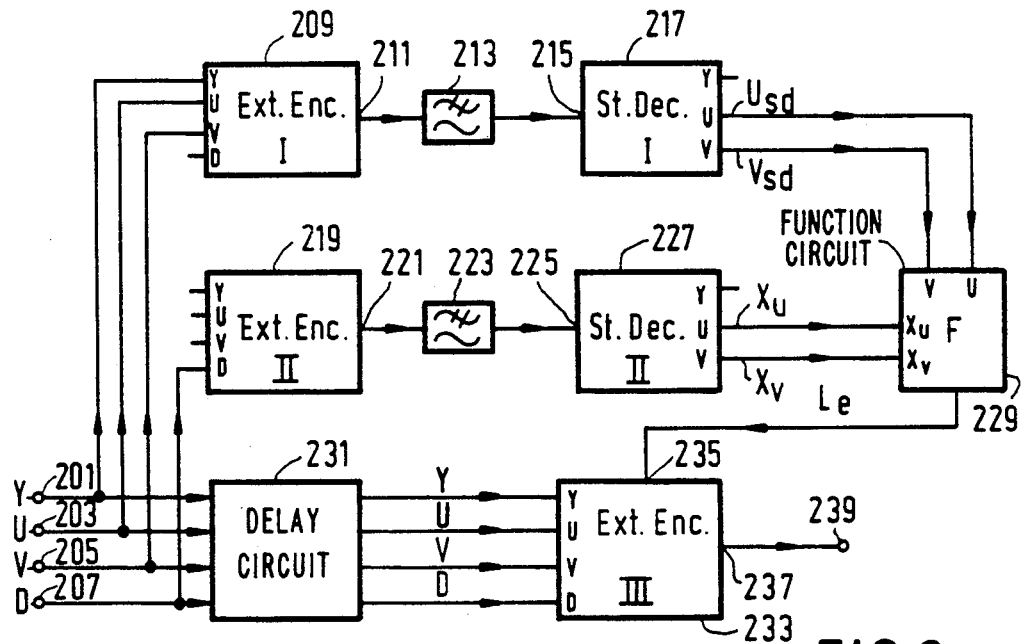
FIG. 2 shows an extended encoding apparatus according to the invention with a possibility to calculate the luminance error signal.

FIG. 2 shows an extended encoding apparatus according to the invention, provided with means for precompensating crosstalk of an additional signal D to a low-frequency luminance signal Ylf. Input signals Y (luminance), U and V (chrominance), and D (the additional signal) are applied to respective inputs 201, 203, 205 and 207. The signals Y, U and V are applied to Y, U and V inputs, respectively, of a first extended encoding circuit (Ext. Enc. I) 209. In a simplified extended encoding apparatus according to the invention, the Y input of the encoding circuit 209 may be disconnected. The D input of the encoding circuit 209 is not connected, to obtain an output signal at the output 211 of the encoding circuit 209 which is absolutely free of crosstalk of the additional signal D. The output 211 of the encoding circuit is connected via a low-pass filter 213 to a video signal input 215 of a first conventional or standard decoding circuit (St. Dec. I) 217, of which the luminance signal output Y is not connected and of which chrominance signal outputs U and V supply crosstalk-free standard decoded chrominance signals Usd and Vsd, respectively.

The D input 207 of the extended encoding apparatus according to the invention is connected to a D input of a second extended encoding circuit (Ext. Enc. II) 219. Luminance and chrominance signal inputs Y, U and V of the encoding circuit 219 are not connected, to obtain an output signal at the output 221 of the encoding circuit 219 which only contains the encoded additional signal D. The output 221 of the encoding circuit 219 is connected via a low-pass filter 223 to a video signal input 225 of a second standard decoding circuit (St. Dec. II) 227, of which luminance signal output Y is not connected and of which chrominance signal outputs U and V supply only crosstalk signals Xu and Xv, respectively, of the additional signal D to the chrominance signals U and V, respectively.

The chrominance signals Usd and Vsd and the crosstalk signals Xu and Xv are applied to U, V, Xu and Xv outputs, respectively, of a function circuit (F) 229, which from these signals calculates the luminance error signal Le. The formula $$Le = Usd*(a*Xu + b*Xv) + Vsd*(c*Xv + d*Xu)$$

provided very good results in practice, in which optimal values for the coefficients a, b, c and d appear to be equal to 1, 0.25, 1 and 0.25, respectively. In a simplified embodiment of the extended encoding apparatus according to the invention the input chrominance signals U and V may be used instead of the crosstalk-free standard decoded chrominance signals Usd and Vsd for the calculation of the luminance error signal Le.

The Y, U, V and D outputs 201, 203, 205 and 207, respectively, of the extended encoding apparatus according to the invention are finally applied to Y, U, V and D inputs of a third extended encoding circuit (Ext. Enc. III) 233 via a compensating delay circuit 231. The luminance error signal Le calculated by function circuit 229 is applied to a luminance error signal input 235 of the encoding circuit 233, to be processed in the manner shown in FIG. 1a in the low-frequency portion Ylf of the luminance signal Y. An output 237 of the encoding circuit 233 supplies the encoded video signal to an output 239 of the extended encoding apparatus according to the invention.

Figure 3:
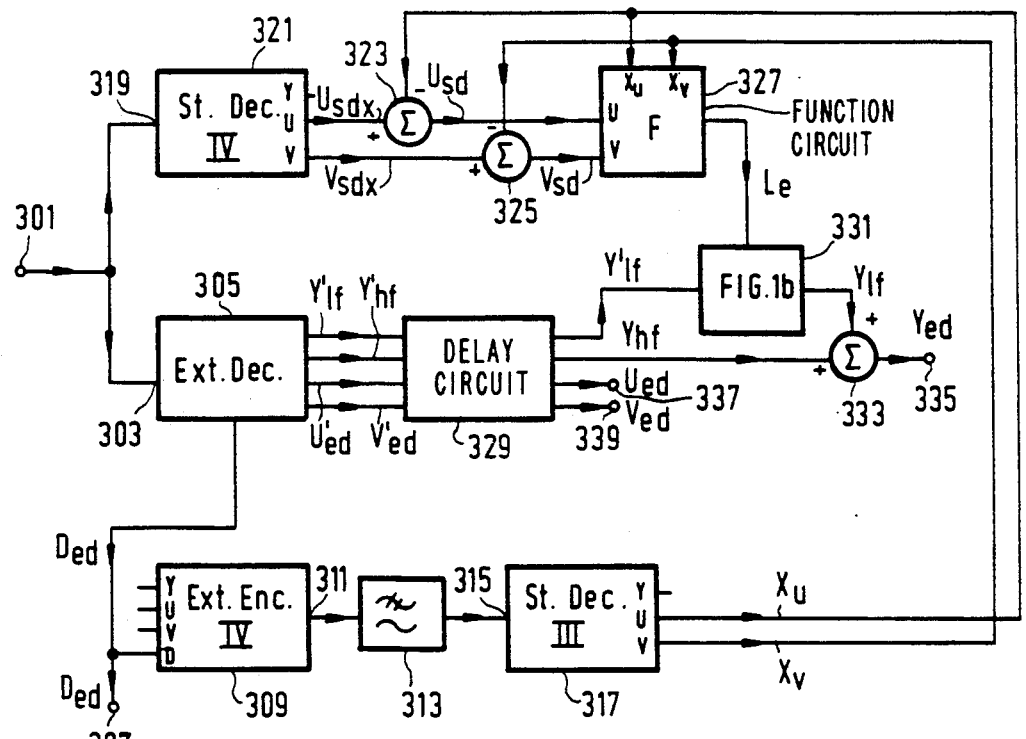
FIG. 3 shows an extended decoding apparatus according to the invention with a first possibility to calculate the luminance error signal.

FIG. 3 shows an embodiment of an extended decoding apparatus according to the invention, provided with means for removing the luminance error signal Le from the precompensated low-frequency luminance signal Ylf'. The encoded video signal is applied to an input 301 of the extended decoding apparatus according to the invention. The input 301 is connected to a video signal input 303 of an extended decoding circuit (Ext. Dec.) 305 for calculating therefrom the precompensated low-frequency luminance signal Ylf', a high-frequency luminance signal Yhf, extended decoded chrominance signals Ued and Ved, and an extended decoded additional signal Ded. The extended decoded additional signal Ded is applied to an output 307 of the extended decoding apparatus according to the invention and to a D input of a fourth extended encoding circuit (Ext. Enc. IV) 309. Luminance and chrominance signal inputs Y, U and V of the encoding circuit 309 are not connected to obtain an output signal at output 311 of the encoding circuit 309 which only contains the encoded additional signal D. The output 311 of the encoding circuit 309 is connected via a low-pass filter 313 to a video signal input 315 of a third standard decoding circuit (St. Dec. III) 317, of which the luminance signal output Y is not connected and of which chrominance signal outputs U and V only supply crosstalk signals Xu and Xv, respectively, of the additional signal D to the chrominance signals U and V, respectively.

The input 301 is furthermore connected to a video signal input 319 of a fourth standard decoding circuit (St. Dec. IV) 321, of which a Y output is not connected and U and V outputs supply via a compensating delay apparatus, not shown, decoded chrominance signals Usdx and Vsdx, respectively, contaminated by crosstalk signals Xu and Xv, respectively. The crosstalk signals Xu and Xv calculated by the decoding circuit 317 are subtracted in subtracting circuits 323 and 325, respectively, from the contaminated chrominance signals Usdx and Vsdx, respectively, to obtain standard decoded chrominance signals Usd and Vsd, respectively. The crosstalk signals Xu and Xv and the chrominance signals Usd and Vsd are applied to a function circuit (F) 327 to obtain the luminance error signal Le in accordance with the formula given in the foregoing.

The precompensated low-frequency luminance signal Ylf', the high-frequency luminance signal Yhf, and the extended decoded chrominance signals Ued and Ved are delayed in a compensating delay circuit 329. The luminance error signal Le is thereafter removed from the delayed precompensated low-frequency luminance signal Ylf' by means of the compensation circuit 331 shown in FIG. 1b to obtain the low-frequency luminance signal Ylf. Subsequently, the low-frequency luminance signal Ylf and the delayed high-frequency luminance signal Yhf are added together in an adder 333 to obtain an extended decoded luminance signal Yed at a luminance signal output 335 of the extended decoding apparatus according to the invention. The delayed extended decoded chrominance signals Ued and Ved are applied to chrominance signal outputs 337 and 339, respectively, of the extended decoding apparatus according to the invention.

Figure 4:
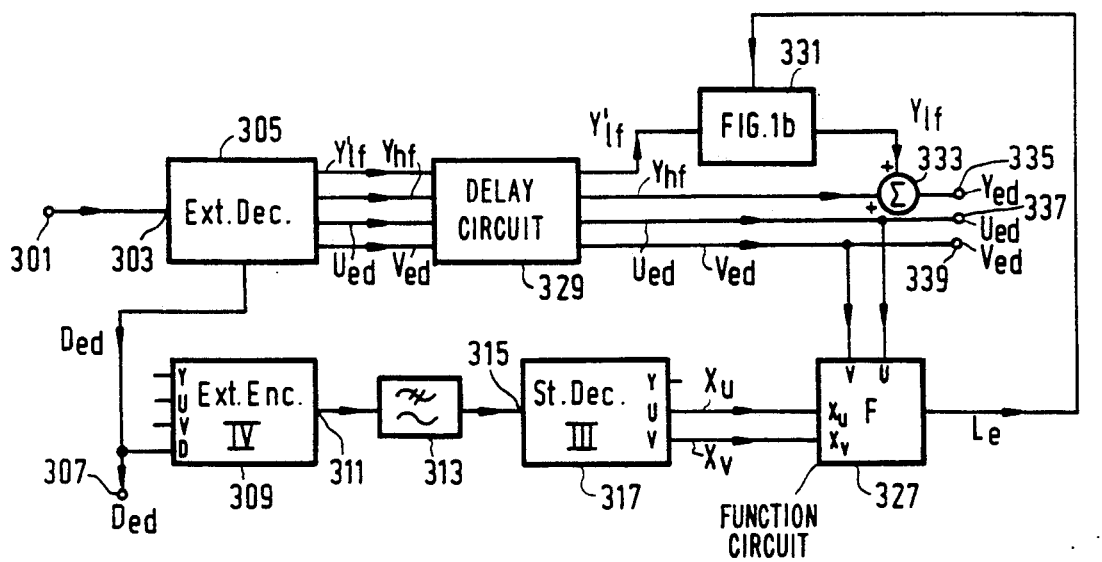
FIG. 4 shows a simplified extended decoding apparatus according to the invention with a second possibility to calculate the luminance error signal.

FIG. 4 shows a simplified embodiment of an extended decoding apparatus according to the invention. Herein it is assumed that the extended decoded chrominance signals Ued and Ved may be considered to be equal to the standard decoded chrominance signals Usd and Vsd, respectively. In FIG. 2 the second standard decoding circuit 227 may therefore be replaced by an extended decoding circuit. In deviation from the extended decoding apparatus according to the invention as shown in FIG. 3, the circuit elements 321, 323 and 325 of FIG. 3 are absent in FIG. 4, and the delayed extended decoded chrominance signals Ued and Ved are applied to the U and V inputs, respectively, of the function circuit (F) 327. In all further respects the apparatus of FIG. 4 corresponds to the apparatus shown in FIG. 3.

In the embodiments of extended encoding and decoding apparati according to the invention described in the foregoing, several encoding and decoding circuits are used with disconnected inputs and/or outputs. It will be obvious that these circuits may be simplified by stripping them as much as possible of all circuit elements which only relate to the disconnected inputs and/or outputs.

In principle, crosstalk of the additional signal D also occurs to the high-frequency luminance signal Yhf, which, because of the non-linearity of the display screen, may result in an interference pattern in the low-frequency luminance signal Ylf. If desired the extended encoding apparatus according to the invention shown in FIG. 2 may alternatively be precompensated for this interference pattern with the aid of a standard decoded luminance signal Ysd at the Y output of the first standard decoding circuit 217 and a crosstalk signal Xy at the Y output of the second standard decoding circuit 227. Subsequently, the extended decoding apparatus according to the invention shown in FIG. 3 may be compensated by means of a crosstalk signal Xy at the Y output of the third standard decoding circuit 317 and a contaminated standard decoded luminance signal Ysdx at the Y output of the fourth standard decoding circuit 321. The simplified extended decoding apparatus according to the invention shown in FIG. 4 may be compensated by means of the crosstalk signal Xy at the Y output of the third standard decoding circuit 317 and for example the delayed high-frequency luminance signal Yhf. The formula for the luminance error signal Le must then be adapted to allow also for the luminance, for example by adding a term $e*Y*Xy$.

The precompensation and compensation according to the invention may be applied with advantage in, for example, any extended television system with encoding of an additional signal in the region of the chrominance subcarrier, as in the EDTV system proposed by Hitachi in Japan and the ACTV system proposed by David Sarnoff Labs. in the United States. The precompensation and compensation according to the invention proved to be suitable for use with very good results in the extended composite television system proposed in the non-prepublished Dutch Patent Application 89.00753 (PHN 12,893). All the extended encoding and decoding circuits shown in the accompanying drawings are according to the system to be improved by the invention.

I claim:

1. An apparatus for decoding an extended television signal encoded compatibly with a conventional television signal, said extended television signal comprising a plurality of conventional television components, and an additional signal, at least one of said conventional television components being combined with a crosstalk precompensation signal, said apparatus comprising:
    a) means for decoding said additional signal so as to obtain a decoded additional signal, and
    b) means coupled to receive said decoded additional signal for obtaining and removing said crosstalk precompensation signal from said extended television signal.

2. The apparatus of claim 1 wherein said crosstalk precompensation signal is a luminance crosstalk error signal and said apparatus further comprises:
    a) means for obtaining a precompensated low frequency luminance crosstalk signal from said extended television signal; and b) means for combining said precompensated low frequency luminance signal and said luminance error signal so as to form a low frequency luminance signal.

3. The apparatus of claim 2 further comprising:
a) means for linearizing said precompensated low frequency luminance signal; and
b) means for gamma correcting said low frequency luminance signal.

4. The apparatus of claim 1, further comprising means for decoding said extended television signal to obtain at least one decoded conventional component and at least one conventional television component; and wherein said obtaining and removing means comprise:
   means for obtaining a crosstalk signal from said decoded additional signal;
   means for deriving said crosstalk precompensation signal from said at least one decoded conventional component and said crosstalk signal; and
   means for combining said crosstalk precompensation signal with said at least one conventional television component.

5. The apparatus of claim 4 wherein said calculating means comprises means for encoding the additional signal into an encoded additional signal and for decoding the encoded additional signal as a conventional video signal so as to obtain said crosstalk signal.

6. The apparatus of claim 5, wherein said extended television signal decoding means comprise conventional television decoding means for obtaining said at least one decoded conventional component contaminated with said crosstalk signal.

7. The apparatus of claim 4, wherein said extended television signal decoding means comprise conventional television decoding means for obtaining said at least one decoded conventional component contaminated with said crosstalk signal.

8. A method for providing an extended television signal from a plurality of conventional television signal components and an additional television signal, comprising the steps of:
   obtaining from said conventional television components a low frequency luminance signal;
   obtaining from at least said additional television signal a precompensating luminance crosstalk error signal;
   combining said low frequency luminance signal and said precompensating luminance crosstalk error signal to form a precompensated low frequency luminance signal; and
   encoding said conventional television components, said precompensated low frequency luminance signal, and said additional television signal to form said extended television signal.

9. The method of claim 8 comprising the further steps of:
a) linearizing said low frequency luminance signal prior to said combining step; and
b) gamma correcting said precompensated low frequency luminance signal.

10. A method for providing an extended television signal from a plurality of conventional television signal components and an additional television signal, comprising the steps of:
   obtaining at least one crosstalk-free television signal component from said conventional television components;
   obtaining at least one crosstalk signal from said additional television signal;
   calculating a precompensation signal from said at least one crosstalk signal and said at least one crosstalk-free television signal component;
   combining said precompensation signal with at least one of said conventional television components to form a precompensated television component; and
   encoding said conventional television components, said precompensated television component, and said additional television signal to form said extended television signal.

11. The method of claim 10 wherein said at least one crosstalk signal is obtained by encoding the additional signal into an encoded additional signal and decoding the encoded additional signal as a conventional video signal.

12. The method of claim 11 wherein said at least one crosstalk-free television signal component is obtained by encoding at least one conventional television signal component into an encoded signal and decoding the encoded signal.

13. The method of claim 10 wherein said at least one crosstalk-free television signal component is obtained by encoding at least one conventional television signal component into an encoded signal and decoding the encoded signal.

* * * * *